Figure 1:
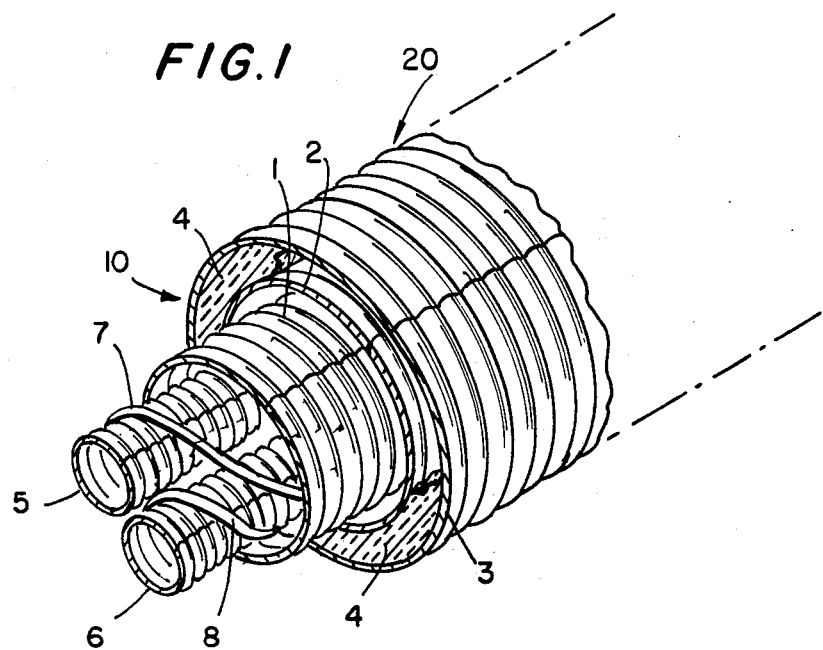

United States Patent [19]

Rohner

[11] 4,303,105

[45] Dec. 1, 1981

[54] INSULATED TRANSMISSION LINE FOR CRYOGENIC MEDIA

[75] Inventor: Peter Rohner, Isernhagen, Fed. Rep. of Germany

[73] Assignee: Kabel-und Metallwerke Gutehoffnungshuette AG, Hanover, Fed. Rep. of Germany

[21] Appl. No.: 143,193

[22] Filed: Apr. 24, 1980

[30] Foreign Application Priority Data

Sep. 28, 1979 [DE] Fed. Rep. of Germany ... 7927533[U]

[51] Int. Cl.³ .............................................. F16L 9/18
[52] U.S. Cl. .................................... 138/149; 138/113; 138/114
[58] Field of Search ................ 138/149, 113, 114, 112

[56] References Cited

U.S. PATENT DOCUMENTS

| | | | |
|---|---|---|---|
| 2,297,165 | 9/1942 | Ringel | 138/113 |
| 3,473,575 | 10/1969 | Vogelsang et al. | 138/114 |
| 3,490,496 | 1/1970 | Stearns | 138/114 |
| 3,565,118 | 2/1971 | Stearns | 138/149 |
| 3,762,447 | 10/1973 | Holland | 138/113 |
| 4,121,623 | 10/1978 | Rhone | 138/114 |
| 4,259,990 | 4/1981 | Rohner | 138/113 |

FOREIGN PATENT DOCUMENTS

503156 5/1951 Belgium ............................. 138/113

*Primary Examiner*—Willis Little
*Attorney, Agent, or Firm*—Martin A. Farber

[57] ABSTRACT

An improved insulated transmission line for the transfer of cryogenic media is disclosed comprising: a tubular heat shield, including at least three concentric, radially separated, corrugated metallic tubular members, that provides a first annular space between two of the tubular members wherein a multiple layer, fibrous insulating material is disposed under vacuum conditions; a second annular space between two of the tubular members, including the innermost of the tubular members, containing a liquid or gaseous cooling media; and a vacuum sealed, inner tubular space formed by the innermost tubular member; the improvement comprising: a plurality of corrugated metal pipes extending through such vacuum sealed inner tubular space and being spacially separated from each other and from the tubular heat shield for providing minimum heat conductance between the metal pipes, and between the metal pipes and the tubular heat shield, throughout their respective axial lengths.

9 Claims, 2 Drawing Figures

INSULATED TRANSMISSION LINE FOR CRYOGENIC MEDIA

The present invention is directed to an insulated transmission line for the transfer of cryogenic media; more particularly, to such a transmission line comprising a super insulating, tubular heat shield, having longitudinally extending therethrough corrugated metal pipes for the transfer of cryogenic media.

German laid open patent No. 1,936,641 discloses a tubular heat shield of the type that may be employed in insulated transmission lines for the transfer of cryogenic media. Such a known tubular heat shield includes at least three concentric, radially separated, corrugated metallic tubular members that provide (i) a first annular space between two of the tubular members wherein multiple layer, fibrous insulating material is disposed under vacuum conditions; (ii) a second annular space between two of the tubular members, including the innermost of the tubular members, wherein a liquid or gaseous cooling media is disposed; and (iii) a hermetically sealed, inner tubular space formed by the innermost tubular member wherein a vacuum condition is maintained. Such a known tubular heat shield provides minimum heat conductance from without the heat shield to the interior of the innermost tubular member. Additionally, the corrugation of each of the tubular members of such heat shield provides flexibility (for convenience of installation) to the insulated transmission line of which it is a principal component.

It is an object of the present invention to provide an improved insulated transmission line for the transfer of cryogenic media, comprising at least two corrugated metal pipes, for the forward and reverse transfer of cryogenic media. Generally, such an insulated transmission line is connected between a source of cryogenic media and a consumer; i.e., between an apparatus for cooling the media and a location remote therefrom whereat the temperature of the cryogenic media is increased from its lowest temperature level and then returned to the cooling apparatus. With such closed circuit operation, it is an object that any heat introduced into the forward transmitting metal pipe, as well as in the return metal pipe, be maintained at an absolute minimum for maximizing operational efficiencies. Such efficiencies are obtained in accordance with the instant invention by extending the corrugated metal pipes longitudinally through the inner tubular space within the tubular heat shield, providing elongated insulating spacers that are positioned at least partially between the metal pipes for maintaining a spacial separation and minimum heat conductance between the corrugated pipes, and at least partially between at least one of the metal pipes and the innermost tubular member of the heat shield for maintaining spacial separation and minimum heat conductance between the metal pipes and the tubular heat shield throughout their respective axial lengths.

Additionally, the corrugated construction of each of such metal pipes, in association with the corrugated construction of the associated heat shield, assures transmission line flexibility, as well as consistency in the radial positioning of such metal pipes with respect to the tubular heat shield, and with respect to each other along their entire respective axial lengths. Such radial positioning consistency is of importance in view of the respective differences in variations in temperature levels that are experienced by each of the metal pipes when employed in bidirectional systems.

In accordance with an embodiment of the instant invention, either one of the metal pipes has a first elongated, insulating spacer helically wound thereabout, and a second elongated insulating spacer helically wound about the combination of the two metal pipes. Alternatively, each of the metal pipes may be provided with its own elongated insulating spacer helically wound thereabout. Preferably, the elongated insulating spacers are helically wound in counter directions to the corrugations of the metal pipes in order to prevent portions of the spacers from sliding into the corrugation troughs.

The metal pipes may have circular cross-sections, or semicircular or one third annular shape cross-sections for more efficient utilization of the encompassing cross-section of the vacuum sealed, inner tubular space through which such metal pipes extend. Further, the metal pipes may have different cross-sectional dimensions, for better accommodating the liquid or gaseous phase of the cryogenic media. Additionally, the instant invention contemplates the metal pipes themselves being coaxially positioned, but radially separated from each other throughout their axial lengths.

Figure 2:
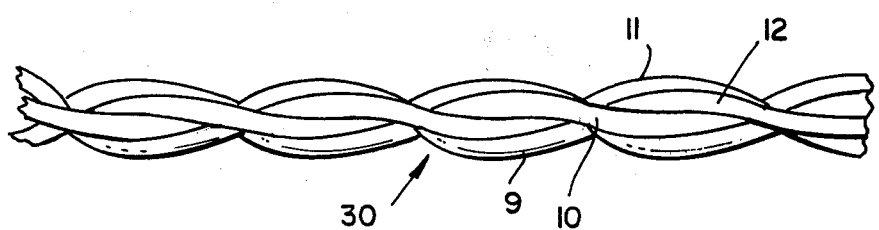

The invention will be more clearly understood by reference to the following detailed description of an exemplary embodiment thereof, in conjunction with the accompanying drawing in which:

FIG. 1 is an isometric view of a length of insulated transmission line in accordance with the teaching of the instant invention; and FIG. 2 is a side elevation view of a length of a plurality of strips of insulating material that form helically wound distance spacers of the type employed in the embodiment illustrated in FIG. 1.

FIG. 1 illustrates a length of insulated transmission line 20, comprising: a tubular heat shield 10 including concentric radially separated, corrugated tubular members 1, 2 and 3; and longitudinally seam welded, corrugated metal pipes 5 and 6, which are spacially separated from each other and longitudinally positioned within the central aperture of the tubular member 1 of the heat shield 10.

The concentrically related, metallic tubular members 1 and 2, are spacially separated by interposed conventional distance spacers (not shown), the annular space therebetween being hermetically sealed at its terminal ends, evacuated and filled with a cooling media such as, for example, liquid nitrogen. The annular space between the opposite adjacent surfaces of the tubular members 2 and 3 is evacuated of conductive gases and has interposed therebetween a multiple layer, fibrous insulating and heat reflecting material 4.

A distance spacer 7 helically wound about two corrugated metal pipes 5 and 6, separates such pipes from the inner surface of the corrugated metallic member 1 of the heat shield 10. To maintain a spacial separation between the corrugated metal pipes 5 and 6 there is further provided a distance spacer 8 helically wound about only the corrugated metal pipe 6. In the instance wherein the insulated transmission line 20 is employed for bi-directional transmission of a cryogenic media (for example, liquified helium), one of the corrugated metal pipes 5 or 6 is employed as the forward conduit, while the other acts as the return conduit. The cross-sectional configuration of each of such pipes 5 and 6 may be particularly adapted to its intended purpose. (For example, if the cryogenic media transmitted is in its liquid phase in its forward passage, and in its gaseous phase in its return passage, the return conduit will preferably have a larger cross-section.) The intermediate volume between the outer surfaces of the metal pipes 5 and 6, and the inner surface of the tubular member 1, is evacuated of gases and hermetically sealed by conventional terminal devices (not shown). Each of the distance spacers 7 and 8 are helically wound in counter directions to the corrugations of each of the metal pipes 5 and 6, thus limiting the sliding of portions of such distance spacers into adjacent corrugation troughs.

FIG. 2 illustrates an advantageous construction of a braided elongated structure 30 employed to form the helically wound distance spacers 7 and 8 of the embodiment illustrated in FIG. 1. Elongated structure 30 is comprised of four strands of insulating plastic material 9, 10, 11 and 12. Each of the strands 9 through 12 are braided with the other strands to form intertwined wave shapes in the longitudinal direction whereby the major surfaces of each strand retain substantially perpendicular orientation to the major surfaces of immediately adjacent strands.

The braided elongated structure 30 is wound about the metal pipe 6 to form the distance spacer 8, as illustrated in FIG. 1. In view of the above described construction of elongated structure 30, the spacer 8 engages the outer surface of the metal pipe 6 at a plurality of minimum areas or point contacts, thus assuring minimum heat conductance. Similarly, the distance spacer 7 wound helically about the metal pipes 5 and 6, provides a minimum heat conductance with the outer surfaces of metal pipes 5 and 6, as well as with the inner surface of the corrugated metallic tubular member 1.

Numerous modifications and variations of the present invention are possible in light of the above teachings and, therefore, within the scope of the appended claims the invention may be practiced otherwise than as particularly described.

I claim:

1. Insulated transmission line for the transfer of cryogenic media, comprising:
a tubular heat shield, including at least three concentric, radially separated, corrugated metallic tubular members, that provides a first annular space between two of said tubular members wherein a multiple layer, fibrous insulating material is disposed under vacuum conditions; a second annular space between two of said tubular members, including the innermost of said tubular members, having disposed therein a liquid or gaseous cooling madia; and a vacuum sealed, inner tubular space formed by said innermost tubular member; the improvement comprising:
first and second longitudinally seam welded, corrugated metal pipes extending through said vacuum sealed, inner tubular space; and
first insulating spacer means positioned about said first metal pipe and at least partially between said first and second metal pipes for maintaining a spacial separation and minimum heat conductance between said metal pipes throughout their respective axial lengths, and second insulating spacer means positioned about at least said second metal pipe and between said metal pipe and said innermost tubular member for maintaining spacial separation and minimum heat conductance between said metal pipe and said innermost tubular member throughout their respective axial lengths.

2. Insulated transmission line in accordance with claim 1, wherein said first corrugated metal pipe provides a passage for the transmission of cryogenic media in a first direction, and said second corrugated metal pipe provides a passage for the transmission of cryogenic media in a second direction.

3. Insulated transmission line in accordance with claim 1, wherein said first insulating spacer means is helically wound about said first metal pipe to provide a spacial separation between said metal pipes, and said second insulating spacer means is helically wound about the combination of said first and second corrugated metal pipes to maintain a spacial separation between said combination of said metal pipes and said innermost tubular member.

4. Insulated transmission line in accordance with claim 1, wherein said first insulating spacer means is helically wound about said first corrugated metal pipe, and said second insulating spacer means is helically wound about said second corrugated metal pipe.

5. Insulated transmission line in accordance with claim 1, wherein said first and second insulating spacer means comprise braided strands of insulating material.

6. Insulated transmission line in accordance with claim 5, wherein said braided strands of insulating material comprise a plurality of plastic strands braided to form intertwined wave shapes in the longitudinal direction, the major surfaces of each of said strands having a perpendicular orientation to the major surfaces of the immediately adjacent strands.

7. Insulated transmission line in accordance with claim 2, wherein said first and second corrugated metal pipes have different cross-sectional shapes.

8. Insulated transmission line in accordance with claim 2, wherein said first and second corrugated metal pipes have different cross-sectional dimensions.

9. Insulated transmission line in accordance with claim 1, wherein said first corrugated metal pipe is coaxially positioned within said second corrugated metal pipe, said first insulating spacer means being positioned between said first and second corrugated metal pipes, and said second insulating spacer means being positioned between said second corrugated metal pipe and said innermost tubular member.

* * * * *